United States Patent
Xie

(10) Patent No.: US 9,521,233 B2
(45) Date of Patent: Dec. 13, 2016

(54) METHOD AND DEVICE FOR RECORDING DATA OF TERMINAL

(75) Inventor: Jun Xie, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 597 days.

(21) Appl. No.: 13/522,525

(22) PCT Filed: Sep. 17, 2010

(86) PCT No.: PCT/CN2010/077034
§ 371 (c)(1),
(2), (4) Date: Jul. 17, 2012

(87) PCT Pub. No.: WO2012/000237
PCT Pub. Date: Jan. 5, 2012

(65) Prior Publication Data
US 2012/0297045 A1    Nov. 22, 2012

(30) Foreign Application Priority Data
Jun. 30, 2010   (CN) .......................... 2010 1 0216734

(51) Int. Cl.
*G06F 15/173* (2006.01)
*H04M 1/725* (2006.01)
(Continued)

(52) U.S. Cl.
CPC ......... *H04M 1/72522* (2013.01); *H04M 1/656* (2013.01); *H04L 2012/563* (2013.01);
(Continued)

(58) Field of Classification Search
CPC ................ H04L 2012/5636; H04L 2463/121; H04L 2012/563; H04L 2012/6443; H04L 2012/5652
(Continued)

(56) References Cited

U.S. PATENT DOCUMENTS 5,572,677 A * 11/1996 Luther et al. ................. 709/206
5,872,777 A *  2/1999 Brailean et al. .............. 370/349
(Continued)

FOREIGN PATENT DOCUMENTS

CN      1611087 A      4/2005
CN      1852355 A      10/2006
(Continued)

OTHER PUBLICATIONS

International Search Report in international application No. PCT/CN2010/077034, mailed on Mar. 31, 2011.
(Continued)

*Primary Examiner* — Oleg Survillo
(74) *Attorney, Agent, or Firm* — Oppedahl Patent Law Firm LLC

(57) ABSTRACT

A method and device for recording data of a terminal are disclosed. The method includes: setting a relation condition list for triggering recording among function modules, and setting a corresponding random probability generator for each function module; determining whether to start recording data, and whether to end the data recording operation in accordance with the relation condition list or the random probability generator, during the operation process of each function module; and sending the respective data packets obtained by recording to a data management module for storage after the data record operation of each function module is ended. By adopting the method and device, fuzzy recording can be performed on data of the terminal, and data of different function modules can be stored centrally, and a query operation is simplified.

11 Claims, 4 Drawing Sheets

(51) Int. Cl.
*H04M 1/656* (2006.01)
*H04L 12/70* (2013.01)
*H04L 12/64* (2006.01)
*H04M 3/42* (2006.01)

(52) U.S. Cl.
CPC ............... *H04L 2012/5636* (2013.01); *H04L 2012/5652* (2013.01); *H04L 2012/6443* (2013.01); *H04L 2463/121* (2013.01); *H04M 3/42221* (2013.01); *H04M 2250/60* (2013.01)

(58) Field of Classification Search
USPC .................................................. 709/233, 223
See application file for complete search history.

(56) References Cited

U.S. PATENT DOCUMENTS

| | | | |
|---|---|---|---|
| 6,052,454 A * | 4/2000 | Kek et al. | 379/188 |
| 6,101,186 A * | 8/2000 | Craig | 370/394 |
| 6,754,311 B1 * | 6/2004 | Kampmeier et al. | 379/32.01 |
| 7,484,157 B2 * | 1/2009 | Park et al. | 714/748 |
| 7,551,922 B2 * | 6/2009 | Roskowski et al. | 455/423 |
| 7,593,962 B2 * | 9/2009 | Beale et al. | |
| 7,823,039 B2 * | 10/2010 | Park et al. | 714/748 |
| 8,126,456 B2 * | 2/2012 | Lotter et al. | 455/432.3 |
| 2002/0044764 A1 * | 4/2002 | Akamatsu et al. | 386/92 |
| 2002/0082818 A1 * | 6/2002 | Ferguson et al. | 703/22 |
| 2003/0083040 A1 | 5/2003 | Ruth | |
| 2005/0038888 A1 * | 2/2005 | Labertz | 709/224 |
| 2005/0086255 A1 * | 4/2005 | Schran et al. | 707/102 |
| 2006/0093325 A1 * | 5/2006 | Imai et al. | 386/83 |
| 2006/0133423 A1 * | 6/2006 | Hamada | 370/474 |
| 2006/0288347 A1 * | 12/2006 | Jemiolo et al. | 718/102 |
| 2010/0100494 A1 * | 4/2010 | Polo-Malouvier et al. | 705/319 |
| 2010/0216400 A1 * | 8/2010 | Ushijima | 455/41.2 |
| 2011/0103239 A1 * | 5/2011 | Wong | 370/252 |

FOREIGN PATENT DOCUMENTS

| | | |
|---|---|---|
| CN | 101202941 A | 6/2008 |
| CN | 101478715 A | 7/2009 |

OTHER PUBLICATIONS

English Translation of the Written Opinion of the International Search Authority in international application No. PCT/CN2010/077034, mailed on Mar. 31, 2011.

Supplementary European Search Report in European application No. 10853940.4, mailed on Aug. 1, 2013. (3 pages—see entire document).

* cited by examiner

METHOD AND DEVICE FOR RECORDING DATA OF TERMINAL

TECHNICAL FIELD

The disclosure relates to the data recording technology in the data monitoring field, and in particular to a method and device for recording data of a terminal.

BACKGROUND

Along with the rapid development of the modern communication technology and communication networks, terminals carried by people become the frequently-used life tools. Many activities performed by people are inseparable from terminals, so the most direct way to learn about a person is to get to know what the person does with a terminal, such as, making a call, receiving and sending a message, downloading information and the like. For example, if the parents want to know what their children have done in a day, they can query the call records or the records of the received/sent messages in the terminals. The query means that each function module of the terminal plays back the previous records and shows the previous records to the user who initiates the query.

The premise of the query operation is that the terminal needs to record relevant data involved in the operations performed by the terminal user. The existing recording method is as follows: if the user makes a call, a call module records the data, such as the specific time of the call, the talk duration and the like, and finally generates a call record list; and if the user receives and sends short messages, then the data, such as the content and time of the received/sent short message are recorded and stored in a short message box.

The above-mentioned recording method has certain disadvantages as follows: firstly, the contents recorded by the function modules are too detailed; taking the short message record as an example, when the parents query the short messages of the children, they not only know about the information of the short message sender/receiver and the time when the short message were received/sent, but also thoroughly know the specific contents of the short messages; however, the short message contents may involve the privacy of children, and the children do not wish their parents to know in detail; in addition, a function module only records a single kind of content, since different function modules of the terminal can only record their own service data, to know about the activities of a terminal user comprehensively, one can only rely on viewing the operation records of each function module of the terminal respectively, thus the operation is troublesome, which wastes a lot of time of the terminal monitoring side.

SUMMARY

In view of the above, the main purpose of the disclosure is to provide a method and device for recording data of a terminal, which can perform a fuzzy recording of data of the terminal, data of different function modules can be stored centrally, and a query operation is simplified.

In order to achieve the above purpose, the technical solution of the disclosure is realized as follows.

The disclosure provides a method for recording data of a terminal, the method includes: setting a relation condition list for triggering recording among function modules; and setting a corresponding random probability generator for each function module; the method further includes:

determining whether to start recording data, and whether to end data recording operation in accordance with the relation condition list or the random probability generator, during operation process of each function module; and sending, by each function module, respective data packets obtained by recording to a data management module for storage after the data recording operation of each function module is ended.

Wherein the relation condition list for triggering recording may be of single-way triggering or bidirectional mutual triggering.

Wherein, generating, by each function module, serial numbers corresponding to data packets formed from respective data, during the data recording process; wherein, the serial number may include a group serial number and an identifier corresponding to each function module.

Wherein the data packet sent from each function module to the data management module may include a respective generated serial number.

wherein the data management module storing the data packets sent by each function module may include:

archiving centrally respective data packets according to the group serial numbers included in the respective data packets.

The disclosure also provides a device for recording data of a terminal, the device includes: function modules and a data management module, wherein the function modules are configured to:

receive a relation condition list and a corresponding random probability generator set by the data management module;

determine whether to start recording data, and whether to end data recording operation in accordance with the relation condition list or the random probability generator, during operation process; and send respective data packets obtained by recording to the data management module after the data recording operation is ended; and the data management module is configured to:

set a relation condition list for triggering recording among function modules;

set a corresponding random probability generator for each function module;

send the setting results to each function module; and store the data packets sent by each function module.

Wherein, the function modules may be further configured to generate serial numbers corresponding to the data packets formed from respective data during the data recording process;

wherein, the serial number may include a group serial number and an identifier corresponding to each function module.

Wherein, the data management module storing the data packets sent from each function module may include the data management module centrally archiving respective data packets according to the group serial numbers included in the respective data packets.

By adopting the method and device for recording data of a terminal provided in the disclosure, a relation condition list for triggering recording among function modules to be monitored is set firstly and a corresponding random probability generator is set for each function module; and whether to start recording data, and whether to end the data recording operation are determined in accordance with the relation condition list or the random probability generator. The factor of random probability is introduced in the data recording process so that the data finally recorded by each function module are only a portion of the service operation data. Therefore, the recorded data have certain fuzziness, and the problem that the record results in the prior art are too detailed can be avoided.

In addition, according to the disclosure, after ending the data recording operation of each function module, each function module sends the respective data packets obtained by recording to the data management module for storage, that is, centrally archiving the respective received data packets to form a record group according to the group serial numbers generated during data recording of each function module; so that the data management module plays back all the data in the same record group to the monitoring side at the same time when the monitoring side makes a query. Therefore, it is convenient for the monitoring side to make a query, and the operation is simple.

DETAILED DESCRIPTION

The basic principle of the disclosure is: setting a relation condition list for triggering recording among function modules to be monitored, and setting a corresponding random probability generator for each function module; during the operation of each function module, determine whether to start recording data, and whether to end the data recording operation in accordance with the relation condition list or the random probability generator; and after ending the data recording operation of each function module, sending, by each function module, the respective data packets obtained by recording to a data management module for storage.

In the disclosure, several function modules of the terminal can be set as function modules to be monitored according to the monitoring requirements; the data recorded by respective function modules to be monitored are stored uniformly to form a record group; one record group corresponds to one group serial number; a data packet formed from the data recorded by each function module in one record group respectively corresponds to one serial number, and the serial number includes a group serial number and an identifier corresponding to each function module. Thus, a plurality of different record groups can be generated finally according to different monitoring requirements. All data in one record group can be played back to the monitoring side at the same time in the query process so that the monitoring side gets to know the operations of the terminal user from various aspects.

The disclosure is further described below in detail with reference to the accompanying drawings and embodiments.

Figure 1:
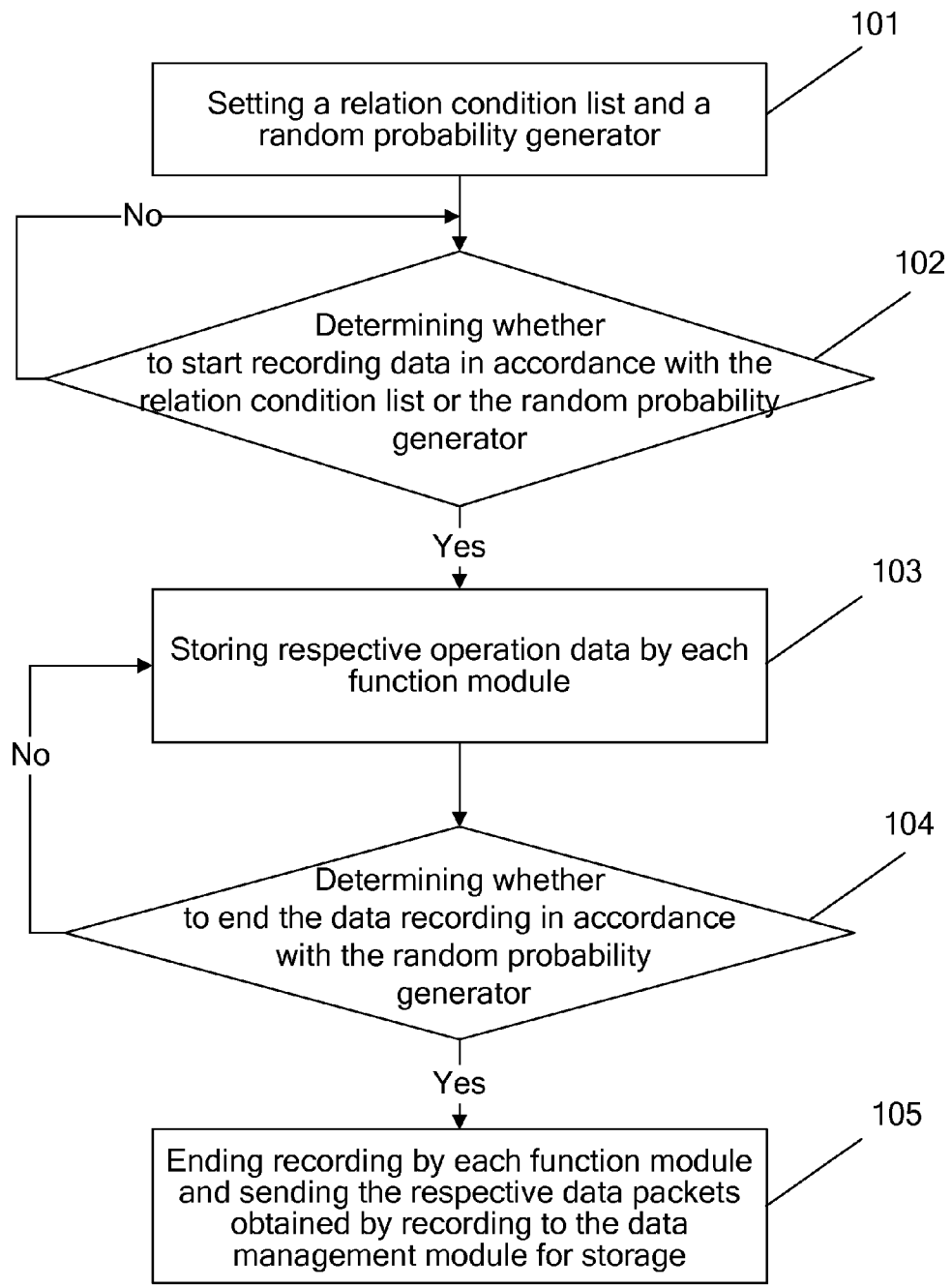
FIG. 1 is a flowchart illustrating a method for recording data of a terminal in the disclosure.

FIG. 1 is a flowchart illustrating a method for recording data of a terminal in the disclosure, as shown in FIG. 1, the method includes the following steps.

Step 101: setting a relation condition list for triggering recording among the function modules to be monitored, and setting a corresponding random probability generator for each function module;

specifically, setting several or all the function modules in the terminal as the monitored objects according to the monitoring requirements; setting the relation condition list for triggering data recording among the function modules to be monitored; and respectively setting a corresponding random probability generator for each function module.

In the present application, the relation condition list is used for realizing the data recording management, which represents the triggering relation among the function modules. As a general rule, the first one of all the function modules, which starts performing the recording operation, initiates recording in dependence on the random probability generator; and the other function modules initiate recording sequentially or simultaneously in dependence on the relation condition list. Wherein the first function module that performs the recording operation can be set randomly. For example: if the function modules to be monitored are A, B and C, then any of the function modules A, B and C can be set as the first function module that starts performing the recording operation in the relation condition list.

In addition, the relation condition list can be of the single-way triggering, for example, for the three function modules A, B and C, only when the module A is in the recording state, can the modules B and C be triggered for recording; and the relation condition list can be of the bidirectional mutual triggering, for example, for the two function modules A and B, if the module A is in the recording state and the module B is in the non-recording state, then the module B is triggered for recording; and the converse is true.

The random probability generator is used for realizing probability events so as to reflect the fuzziness of the data recording. The random probability generator can be the random function "rand" of standard C library and is also set according to the monitoring requirements. For example, if the monitoring side desires to realize the data monitoring with 50% probability, it may be set that: the recording operation is performed when rand( )%2=0, and no recording operation is performed when rand( )%2=1, which indicates that: if the input value of the random function "rand" is the integers 0, 1, 2, 3 . . . , the recording operation is performed when the input value of the random function "rand" is an even number; and no recording operation is performed when the input value of the random function "rand" is an odd number. Certainly, in order to realize monitoring data with 50% probability, the random function "rand" can be realized in a plurality of different ways.

Step 102: determining, by each function module, whether to start recording data accordance with the relation condition list or the random probability generator; if yes, performing the step 103; otherwise, returning to the step 102;

specifically, during the operation process of each function module, determining whether to start recording data in accordance with the relation condition list or the random probability generator; determining, by the first function module of all the function modules to be monitored, whether to start recording data in accordance with the set random probability generator; determining, by the other function modules, whether to start recording data according to the set relation condition list; for example, if the first function module is in the data recording state, then triggering the other function modules to start recording data; and if the first function module is not in the data recording state, not triggering the other function modules to record data; in this process of determining, if it is determined to record, continuing to execute the step 103; otherwise, continuing executing the operation of determining in this step.

Step 103: storing respective operation data by each function module;

specifically, storing, by each function module, the data generated in the respective operation process so as to obtain respective corresponding data packets.

Furthermore, while storing data, each function module further generates a serial number corresponding to the data packet formed from respective data. The serial number includes a group serial number and an identifier corresponding to each function module; the group serial number can be represented by a serial number, such as A, B, C and so on, or can be a mark, such as a time stamp. The identifiers corresponding to the respective function modules can be represented as 1, 2, 3 and so on, in this way, the serial number corresponding to the respective data packet of each function module can be finally represented as A-2, which represents the data packet corresponding to the second function module in the group A.

The group serial number can be generated by the first function module of the function modules to be monitored, for example, if the function module A is the first function module and is in the recording state currently, the function module B starts recording due to triggering of the function module A, the group serial number in the serial number finally generated by the function module B is the same as the group serial number generated by the function module A.

In addition, if one function module is triggered by a plurality of relation condition lists successively, the multiple serial numbers finally generated by the function module may respectively include different group serial numbers; that is to say, one relation condition list corresponds to one group serial number; and group numbers included in the serial numbers generated by the same function module which is triggered successively by different relation condition lists are different.

Step 104: determining, by each function module, whether to end the data recording in accordance with the random probability generator; if yes, performing the step 105; otherwise, returning to the step 103;

specifically, determining, by each function module, whether to end the data recording according to the operation result of the random probability generator, wherein the determining method is similar to that in the step 101; if yes, performing the step 105; otherwise, returning to the step 103 to continue to store the operation data.

Herein, besides the operation result of the random probability generator, the premise condition to end the recording operation by the function module also includes other notifications of ending the recording operation, which is sent by the data management module.

Step 105: ending recording by each function module and sending the respective data packets obtained by recording to the data management module for storage;

specifically, ending the current data recording operation by each function module and sending the respective data packets obtained by recording to the data management module for storage, wherein the data packet includes information of respective corresponding serial number and group serial number; in this way, in the storage process, the received data packets are centrally archived by the data management module according to the group serial number in each data packet, so as to form a record group to facilitating performing the playback operation.

After ending the recording, each function module sets the recording state thereof as the record-completed state and informs the data management module of the state so that the data management module can determine to start the operation of storing and archiving.

Furthermore, when the monitoring side makes a query on the recorded data, all the data in one record group can be played back to the monitoring side at the same time so that it is convenient for the monitoring side to know about the terminal user from various aspects.

The disclosure is further described in detail below with reference to a specific embodiment.

The embodiment realizes a simple fuzzy recording for voice call segments and realizes segmental recording with 50% probability for all the calls. The function modules needed to be monitored are as follows: a liquid crystal display module, a downlink speech frame data processing module, an uplink speech frame data processing module and a call control module, which respectively record corresponding display data, audio play data, the audio transmission data and data of the call connection event. The relation condition lists corresponding to the four function modules to be monitored is a one-to-three triggering relation, that is to say, as long as the call control module is in the recording state, the other three function modules are triggered to record the data; and corresponding random probability generators are configured for the respective function modules according to 50% probability.

Figure 2:
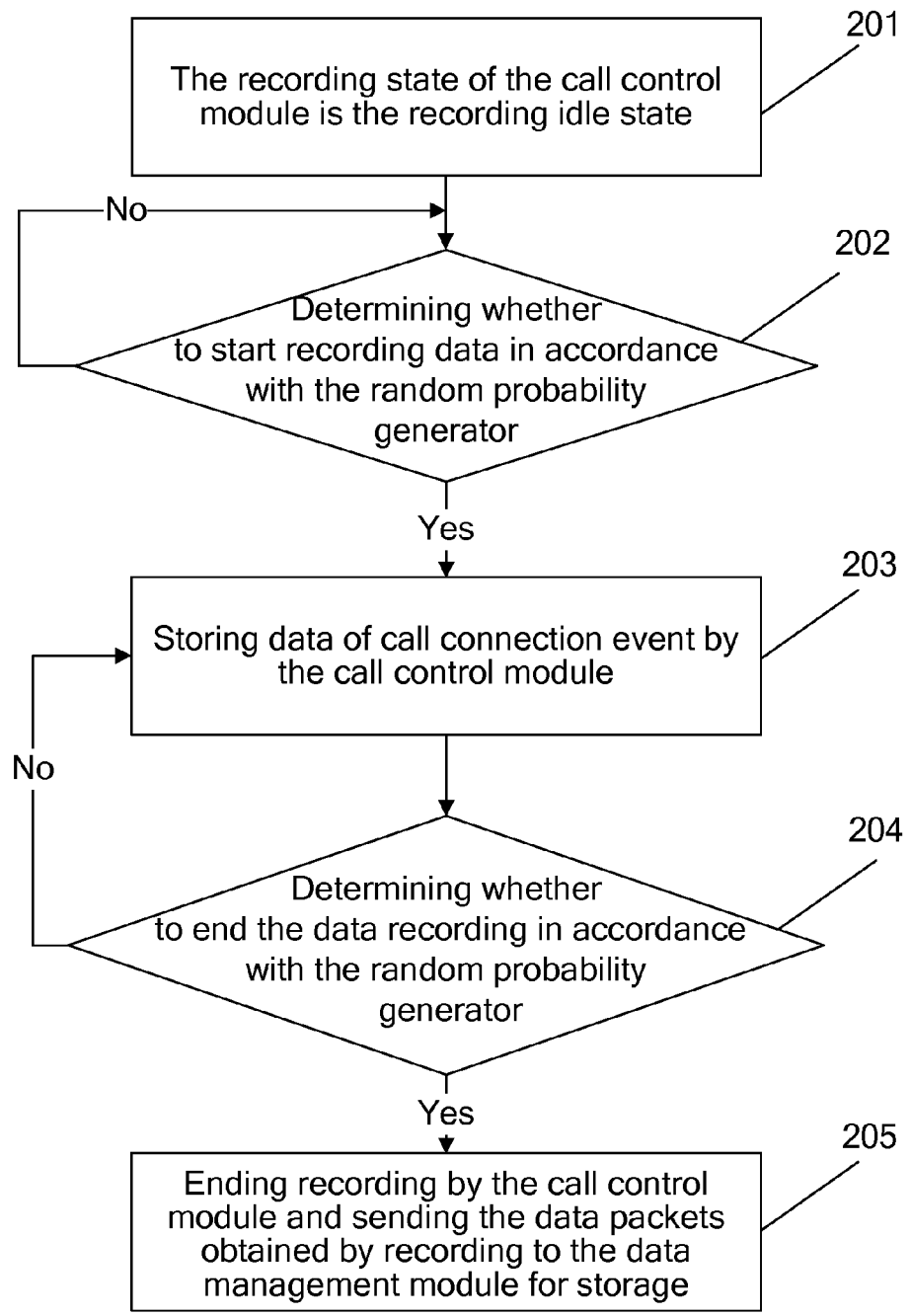
FIG. 2 is a flowchart illustrating a data recording method of a call control module in an embodiment of the disclosure.

The process for realizing the data recording method of the call control module in this embodiment is described firstly as follows; as shown in the FIG. 2, the process is realized by following steps.

Step 201: the recording state of the call control module is the recording idle state.

Here, the recording idle state is the initialization state of the recording.

Step 202: determining, by the call control module, whether to start recording data in accordance with the random probability generator; if yes, performing the step 203; otherwise, returning to the step 202.

Here, the random probability generator can be set as the random function "rand" of the standard C library; as the preset probability is 50%, it can be set that: when the rand( )%2=0, the call control module does not perform the recording operation and returns to the step 202; and when the rand( )%2=1, the call control module performs the recording operation and continues to perform the step 203.

The rand( )%2 is a way provided for realizing the 50% probability, whose result is 0 or 1; and the two results meet the original design requirement of average distribution, that is to say, they meet the requirement of 50% probability; when the requirement on probability changes, the corresponding probability implementation formula changes correspondingly.

Step 203: storing the call connection event data by the call control module.

Here, as the call control module has just started to establish the call event, the data of the call connection event may be the data of the event that the call establishment is completed; and the data are stored.

Furthermore, while storing the data, the call control module also generates serial numbers corresponding to the data packets formed from the data stored by itself; the serial numbers include group serial numbers and identifiers corresponding to the respective function modules. Here, the group serial number can be the local time, at which the call establishment is accomplished, such as T1, and the identifier corresponding to the module can be set as "call", so the serial number finally generated by the call control module can be represented as T1-call. In addition, the call control module also sends the generated group serial number T1 to the other three function modules.

In this step, while starting storing data, the call control module may set its recording state as the recording state and informs the other three function modules of this recording state.

Step 204: determining, by the call control module, whether to end the recording operation in accordance with the random probability generator; if yes, performing the step 205; otherwise, returning to the step 203.

Specifically, determining, by the call control module, whether to end the data recording in accordance with the random probability generator, for example, if the input value of the random function "rand" at this moment is an even number, ending the data recording and continuing to perform the step 205; if the input value is an odd number, not ending the data recording and returning to the step 203.

Alternatively, determining whether or not a notification of ending the recording operation, such as a notification message of ending the record group, which is sent by the data management module, is received; if yes, performing the step 205; otherwise, returning to the step 203 to continue to store the operation data, such as data of the call ending event.

Step 205: ending recording the data by the call control module, and sending the data packet obtained by recording to the data management module for storage.

Here, the data packet uploaded by the call control module includes the serial number set in the step 203.

Figure 3:
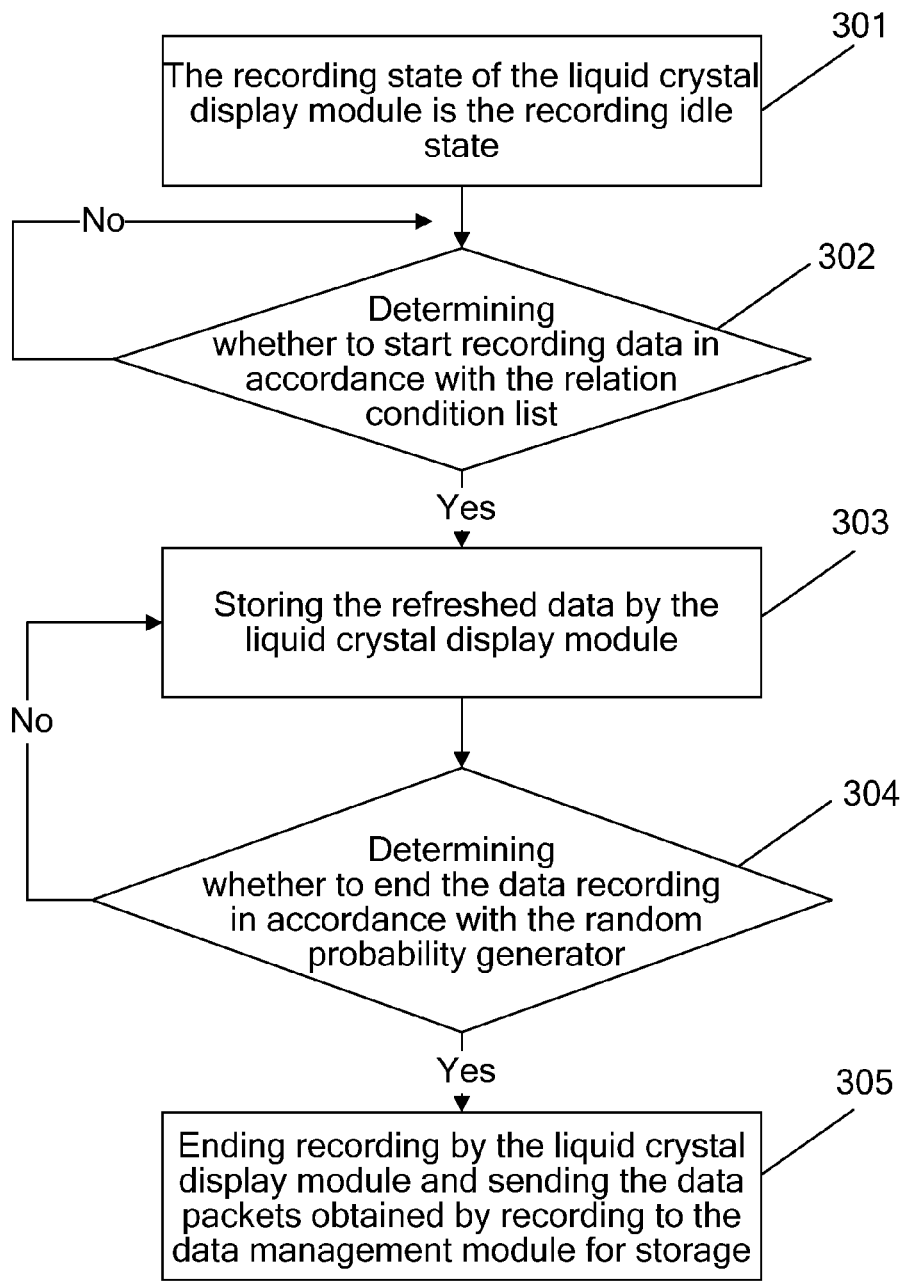
FIG. 3 is a flowchart illustrating a data recording method of a liquid crystal display module in an embodiment of the disclosure.

In this embodiment, since the relation condition list is of one-to-three triggering relation, and the set probabilities are the same, consequently, for the liquid crystal display module, the downlink speech frame data processing module and the uplink speech frame data processing module, the processes for realizing the data recording are the same. A data recording method is described below by taking the liquid crystal display module as an example; as shown in the FIG. 3, the method includes the following steps.

Step 301: the recording state of the liquid crystal display module is the recording idle state.

Here, the recording idle state is the initialization state of the recording.

Step 302: determining, by the liquid crystal display module, whether to start recording data in accordance with a relation condition list; if yes, performing the step 303; otherwise, returning to the step 302.

Here, whether or not the liquid crystal display module starts recording data may be determined in accordance with the relation condition list; if a notification indicating that the call control module is in the recording state is received at this moment, performing the step 303; and if no notification indicating that the call control module is in the recording state is received at this moment, returning to the step 302.

Step 303: storing the refreshed data by the liquid crystal display module.

Here, while storing the refreshed data, the liquid crystal display module further generates the serial number corresponding to the data packet formed from the data stored by itself; since the generated group serial number has been sent from the call control module to the liquid crystal display module, the liquid crystal display module also sets the group serial number as T1 and generates its identifier; consequently, the serial number finally generated by the liquid crystal display module can be represented as T1-1cd.

Step 304: determining, by the liquid crystal display module, whether to end the recording operation in accordance with the random probability generator; if yes, performing the step 305; otherwise, returning to the step 303.

Specifically, determining, by the liquid crystal display module, whether to end the data recording in accordance with the random probability generator, for example, if the liquid crystal display module is required to end recording after recording continuously for n seconds starting from triggering according to the design requirement, wherein n is a randomly distributed integer, such as 1, 2, 3, 4 or 5, then the random probability generator is set as rand( )%+1 to control whether the liquid crystal display module performs the data recording operation.

Alternatively, determining whether or not a notification of ending the recording operation, such as a notification message of ending the record group, which is sent by the data management module, is received; if yes, performing the step 305; otherwise, returning to the step 303 to continue to store the refreshed data.

Step 305: ending recording by the liquid crystal display module, and sending the data packets obtained by recording to the data management module for storage.

Finally, the data management module receives the recorded data packets sent by the four modules and centrally archives the data packets according to the group serial number; and when the monitoring side needs to query the recorded data, the data management module plays back all the data in the same record group to the monitoring side. Therefore, the query operation of the monitoring side is simplified.

Figure 4:
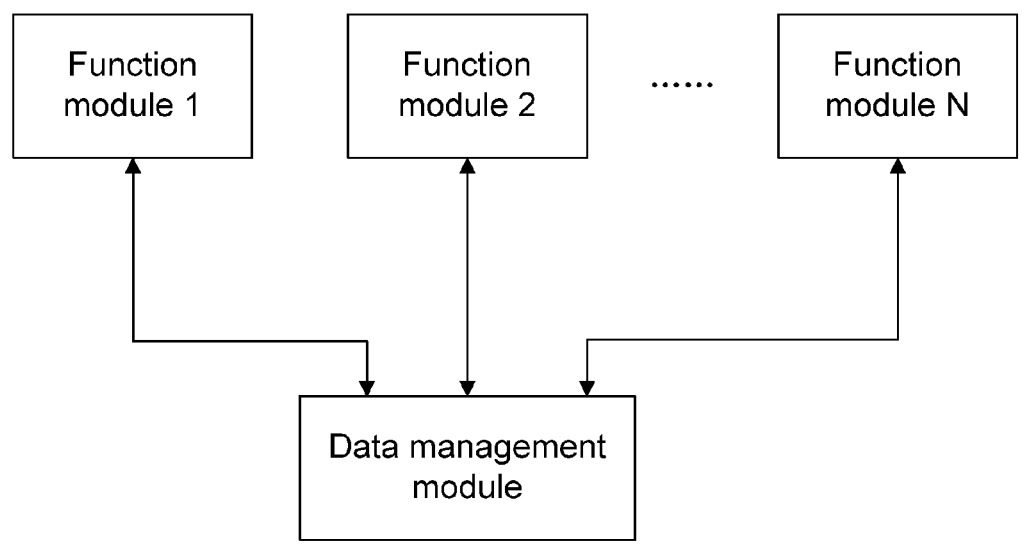
FIG. 4 is a schematic diagram illustrating the structure of a device for recording data of a terminal.

In order to realize the method, the disclosure also provides a device for recording data of a terminal; as shown in the FIG. 4, the device includes function modules and a data management module; and certainly, the device includes a plurality of function modules, wherein the function modules are configured to: receive a relation condition list and a corresponding random probability generator that are set by the data management module; determine whether to start recording data, and whether to end the data recording operation in accordance with the relation condition list or the random probability generator, during the operation process; and send respective data packets obtained by recording to a data management module for storage after the data recording operation is ended; and the data management module is configured to: before the operation of each function module, set a relation condition list for triggering recording among the function modules, and set a corresponding random probability generator for each function module; send the setting results to each function module; and store the data packets sent by each function module.

The function modules are further configured to generate serial numbers corresponding to the data packets formed from the respective data during the data recording process, wherein the serial numbers includes a group serial number and an identifiers corresponding to each function module; and storing the data packets sent from each function module to the data management module includes the data management module centrally archiving the respective data packets according to the group serial numbers included in the respective data packets.

The above is only the preferred embodiments of the disclosure and not intended to limit the protection scope of the disclosure. Any modifications, equivalent replacements, improvements and the like within the spirit and principle of the disclosure shall fall within the protection scope of the disclosure.

The invention claimed is:

1. A method for recording data of a terminal, the terminal containing hardware and including a plurality of function modules, the method comprising:

setting several or all function modules of the plurality of function modules as the monitored function modules according to a monitoring requirement;

setting a relation condition list for triggering recording among the monitored function modules;

setting a corresponding random probability generator for each function module of the monitored function modules;

determining whether to start recording data, and whether to end data recording operation in accordance with the relation condition list or the random probability generator, during operation process of each function module of the monitored function modules; and sending, by each function module of the monitored function modules, by means of hardware contained in the terminal, respective data packets obtained by recording to a data management module for storage after the data recording operation of each function module of the monitored function modules is ended;

wherein the relation condition list represents the triggering relation among the monitored function modules of the terminal, comprising: as long as one function module of the monitored function modules is in a recording state, the other function modules of the monitored function modules are triggered to start recording data, the first one of the monitored function modules, which starts performing the recording operation, initiates recording in dependence on the random probability generator, and the other function modules of the monitored function modules initiate recording sequentially or simultaneously in dependence on the relation condition list;

wherein the monitored function modules comprise: a liquid crystal display module, a downlink speech frame data processing module, an uplink speech frame data processing module and a call control module.

2. The method according to claim 1, wherein the relation condition list for triggering recording is of single-way triggering or bidirectional mutual triggering.

3. The method according to claim 1, further comprising: generating, by each function module of the monitored function modules, serial numbers corresponding to data packets formed from respective data, during the data recording process;

wherein, the serial number includes a group serial number and an identifier corresponding to each function module of the monitored function modules.

4. The method according to claim 3, wherein the data packet sent from each function module of the monitored function modules to the data management module includes a respective generated serial number.

5. The method according to claim 4, wherein the data management module storing the data packets sent by each function module of the monitored function modules comprises:

archiving centrally respective data packets according to the group serial numbers included in the respective data packets.

6. The method according to claim 2, further comprising: generating, by each function module of the monitored function modules, serial numbers corresponding to data packets formed from respective data, during data recording process;

wherein, the serial number includes a group serial number and an identifier corresponding to each function module of the monitored function modules.

7. The method according to claim 6, wherein the data packet sent from each function module of the monitored function modules to the data management module includes a respective generated serial number.

8. The method according to claim 7, wherein the data management module storing the data packets sent by each function module of the monitored function modules comprises:

archiving centrally respective data packets according to the group serial numbers included in the respective data packets.

9. A device for recording data of a terminal, the terminal containing hardware, the device comprising:

a processor;

a memory;

a plurality of function modules;

and a data management module, wherein:

the function modules are configured to:

receive a relation condition list and a corresponding random probability generator set by the data management module;

determine whether to start recording data, and whether to end data recording operation in accordance with the relation condition list or the random probability generator, during operation process; and send respective data packets obtained by recording to the data management module by means of hardware contained in the terminal after the data recording operation is ended; and the data management module is configured to:

set several or all function modules of the plurality of function modules as the monitored function modules according to a monitoring requirement;

set the relation condition list for triggering recording among the monitored function modules;

set the corresponding random probability generator for each function module of the monitored function modules;

send the setting results to each function module of the monitored function modules; and store the data packets sent by each function module of the monitored function modules;

wherein the relation condition list represents the triggering relation among the function modules of the terminal, comprising: as long as one function module of the monitored function modules is in a recording state, the other function modules of the monitored function modules are triggered to start recording data, the first one of the monitored function modules, which starts performing the recording operation, initiates recording in dependence on the random probability generator, and the other function modules of the monitored function modules initiate recording sequentially or simultaneously in dependence on the relation condition list;

wherein the data management module is the result of execution on the processor of software stored in the memory;

wherein the monitored function modules comprise: a liquid crystal display module, a downlink speech frame data processing module, an uplink speech frame data processing module and a call control module.

10. The device according to claim 9, wherein the function modules are further configured to generate serial numbers corresponding to the data packets formed from respective data during the data recording process;

wherein, the serial number includes a group serial number and an identifier corresponding to each function module of the monitored function modules.

11. The device according to claim 10, wherein the data management module storing the data packets sent from each function module of the monitored function modules comprises the data management module centrally archiving respective data packets according to the group serial numbers included in the respective data packets.

* * * * *